United States Patent [19]

Dybro

[11] Patent Number: 5,443,302

[45] Date of Patent: Aug. 22, 1995

[54] ANTI-CINCH AND ANTI-CHAFE SEAT BELT SYSTEM

[75] Inventor: Niels Dybro, Carmel, Ind.

[73] Assignee: Indiana Mills & Manufacturing, Inc., Westfield, Ind.

[21] Appl. No.: 161,333

[22] Filed: Dec. 2, 1993

Related U.S. Application Data

[63] Continuation of Ser. No. 854,213, Mar. 20, 1992, Pat. No. 5,292,181.

[51] Int. Cl.⁶ ............................................. B60R 22/28
[52] U.S. Cl. .................................... 297/471; 297/470; 297/483; 280/801.2; 280/805
[58] Field of Search ........................... 280/805, 801.2; 297/483, 470, 474, 468, 471

[56] References Cited

U.S. PATENT DOCUMENTS

| | | |
|---|---|---|
| 2,880,815 | 4/1959 | Apfelbaum . |
| 2,891,804 | 6/1959 | Frayne et al. . |
| 3,107,121 | 10/1963 | Mougey . |
| 3,128,124 | 4/1964 | Fredericks et al. . |
| 3,243,232 | 3/1966 | Blaszkowski . |
| 3,300,248 | 1/1967 | Nakolan . |
| 3,318,634 | 9/1967 | Nicholas . |
| 3,330,599 | 7/1967 | Inoue . |
| 3,429,614 | 2/1969 | Huggins . |
| 3,551,002 | 12/1970 | Dozois . |
| 3,583,763 | 6/1971 | Settimi et al. . |
| 3,584,896 | 6/1971 | Jantzen . |
| 3,606,456 | 9/1971 | Cazabon . |
| 3,838,746 | 10/1974 | Andres . |
| 3,880,448 | 4/1975 | Lipschutz . |
| 3,947,058 | 3/1976 | Laporte . |
| 4,126,356 | 11/1978 | Takada . |
| 4,135,737 | 1/1979 | Scholz ........................... 280/801.2 |
| 4,173,357 | 11/1979 | Jahn ............................... 280/801.2 |
| 4,201,418 | 5/1980 | Reidelbach et al. . |
| 4,222,609 | 9/1980 | Andersson . |
| 4,222,610 | 9/1980 | Takada . |
| 4,506,912 | 3/1985 | Ahad . |
| 4,611,854 | 9/1986 | Pfeiffer . |
| 4,652,012 | 3/1987 | Biller ............................... 280/801.2 |
| 4,832,410 | 5/1989 | Bougher . |
| 4,846,498 | 7/1989 | Fohl ................................ 280/801.2 |
| 4,919,484 | 4/1990 | Bougher et al. . |
| 5,265,908 | 11/1993 | Verellen ......................... 297/483 X |

FOREIGN PATENT DOCUMENTS

| | | |
|---|---|---|
| 2646388 | 11/1990 | France . |
| 2259664 | 6/1974 | Germany . |
| 3742389 | 6/1989 | Germany ....................... 280/801.2 |
| 2031966 | 2/1990 | Japan ............................. 280/801.2 |
| 313509 | 8/1969 | Sweden . |
| 2113978 | 8/1983 | United Kingdom . |
| 2230936 | 11/1990 | United Kingdom ........... 280/801.2 |

Primary Examiner—Peter R. Brown
Assistant Examiner—David E. Allred
Attorney, Agent, or Firm—Woodward, Emhardt, Naughton, Moriarty & McNett

[57] ABSTRACT

A seat belt system includes a first mounting bracket and a belt buckle, and a first connecting member connectable with the belt buckle and the first mounting bracket. The first connecting member is coupled with the first mounting bracket and is movable relative the first mounting bracket between retracted and extended positions. A first biasing device is provided for biasing the first connecting member in the retracted position. A corresponding retractor assembly coupled with a second mounting bracket and movably biased relative the second mounting bracket between like retracted and extended positions is also disclosed for use in conjunction with the seat buckle assembly to cause the seat belt to move upwardly rather than laterally relative the occupant, thereby preventing chafing of the occupant by the seat belt and reducing lateral accelerations applied to the upper torso of the occupant by the seat belt system.

1 Claim, 9 Drawing Sheets

ANTI-CINCH AND ANTI-CHAFE SEAT BELT SYSTEM

This application is a continuation of application Ser. No. 07/854213, filed Mar. 20, 1992, now U.S. Pat. No. 5,292,181.

BACKGROUND OF THE INVENTION

This invention relates generally to seat belt systems, including buckles, retractors, webbing and tongues, and more particularly to an assembly useful in a seat belt system which includes an automatic locking belt retractor.

Seat and shoulder belt systems, such as those typically employed in passenger vehicles, include an automatic retractor device for collecting excess belting and providing tensioning for the system. The system may include, for example, a spring-biased spool for urging the webbed belt around the spool and thus into the retractor. Once the seat belt and shoulder harness are secured by buckling, the excess belt is retracted.

In systems including certain automatic locking retractors, the belt will pay out of the retractor only after the belt has been fully retracted. One drawback of such systems is that the belt may therefore cinch down on the occupant, and the tightened condition cannot be relieved without removing the belt and retracting it fully into the retractor. During a rough ride, the occupant may be pushed or bounced down into the seat, at which time the retractor recognizes the slack in the belt and retracts the belt eliminating the slack. When the seat attempts to move to the original position, the retractor will not pay out webbing, and the occupant is restrained in the lower position.

In prior U.S. Pat. Nos. 4,832,410 and 4,919,484, a seat belt buckle assembly is disclosed which overcomes the cinching problem by providing a mechanism to offset the tendency of the retractor to collect all the slack in the belt. The mechanism includes a means for collecting a portion of the extended belt in lieu of collection by the automatic locking retractor, and then paying the belting back out to compensate for movement in the vehicle seat.

Nevertheless, there is always a need for an improved seat belt system which overcomes the cinching problem of systems including an automatic locking retractor. For example, seat belt systems which collect and pay out a seat belt may cause the seat belt to move relative to the occupant, thereby resulting in chafing of the occupant. Therefore, a need exists for a seat belt system which minimizes chafing. Such a seat belt system would also overcome the cinching problem of systems including an automatic locking retractor.

SUMMARY OF THE INVENTION

Briefly describing one aspect of the present invention, there is provided a seat belt assembly which includes a first mounting bracket and a belt buckle, and a first connecting member connectable with the belt buckle and the first mounting bracket. The first connecting member is coupled with the first mounting bracket and is movable relative the first mounting bracket between first and second positions, the first connecting member being retracted relative the first mounting bracket in the first position and the first connecting member being extended relative the first mounting bracket in the second position. First biasing means are provided for biasing the first connecting member in the first position.

The seat belt assembly also includes a second mounting bracket and a mating tongue lockable with the belt buckle to form a tongue-buckle combination, and a second connecting member connectable with the tongue and the second mounting bracket. The second connecting member is coupled with the second mounting bracket and is movable relative the second mounting bracket between third and fourth positions, the second connecting member being retracted relative the second mounting bracket in the third position and the second connecting member being extended relative the second mounting bracket in the fourth position. Second biasing means are provided for biasing the second connecting member in the third position.

It is an object of the present invention to provide a seat belt system which overcomes the tendency of the seat belt to chafe the occupant.

A further object of the present invention is to provide a seat belt system which can pay out belt and take in slack without chafing the occupant.

Another object of the present invention is to provide a seat belt system useful in conjunction with an automatic locking retractor.

It is another object of the present invention to provide a seat belt system which overcomes the tendency of an automatic locking retractor system to cinch down upon a user.

A further object of the present invention is to provide comfort to the occupant of any seat belt system by reducing the acceleration applied to the occupant through the seat belt system.

DESCRIPTION OF THE PREFERRED EMBODIMENT

Figure 1:
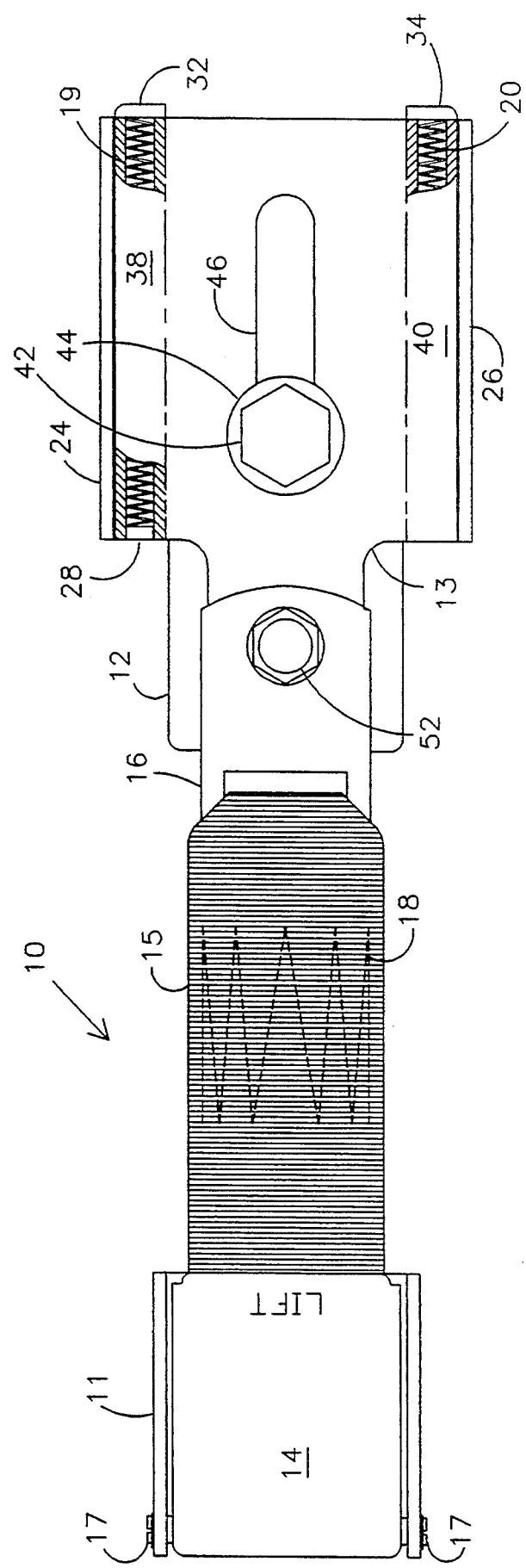
FIG. 1 is a fragmentary top plan view of a buckle assembly according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In certain seat belt systems, an automatic locking retractor is employed. This retractor operates so that the excess length of belt is collected and the belt is locked in position. In such devices, however, it is possible that the retractor may withdraw an excess amount of the belt, thus holding the user in a more restricted position than desired.

For example, certain vehicles employ seats which have a significant amount of movement, such as vertical motion resulting from passage of the vehicle over a rough surface. It is possible in these conditions for an automatic locking retractor to "cinch down" the lap belt on the occupant, whereby an additional length of belt is withdrawn and locked when the seat moves downwardly relative the vehicle. The present invention provides a mechanism useful, for example, in systems having an automatic locking retractor, to avoid the "cinching down" of the lap belt.

Referring now to FIG. 1, a seat belt buckle assembly 10 is shown including a seat belt buckle 11 connected with a mounting bracket 12. The buckle 11 may be of any conventional design such as those designs typically used with seat belts. In FIG. 1, buckle 11 is a conventional buckle which operates to engage or disengage a mating tongue by lifting and pivoting lever 14 about pins 17. Buckle 11 may also permit adjustment relative to flexible webbing 15 to properly secure an occupant in a seat when the buckle is locked with the mating tongue.

Means are provided for connecting the buckle 11 to the bracket 12 via a connecting member 13. A mounting clip 16 connects buckle 11 with flexible webbing 15 to connecting member 13. Flexible webbing 15 is secured to buckle 11 and mounting clip 16 by looping through corresponding apertures and stitching, as shown at 18, to the adjacent webbing material. Mounting bracket 12 is coupled with connecting member 13, whereby connecting member 13 is movable relative to mounting bracket 12. Preferably, the connecting member 13 is slidable with respect to mounting bracket 12 as described hereafter with respect to subsequent FIGS. 2–5.

A pair of compression springs 19 and 20 urge connecting member 13 into a first position which holds buckle 11 in a retracted position relative to mounting bracket 12. Connecting member 13 is movable relative to mounting bracket 12 against a predetermined resistive force provided by springs 19 and 20 to move buckle 11 into a second, extended position relative to mounting bracket 12.

Figure 2:
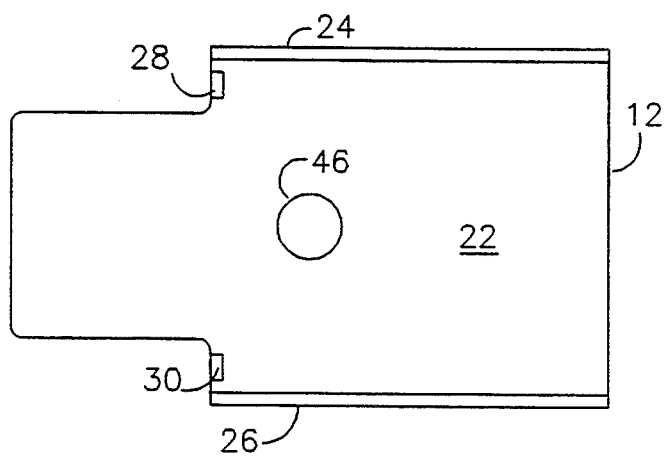
FIG. 2 is a reduced top plan view of a mounting bracket of the buckle assembly of FIG. 1.
Figure 3:
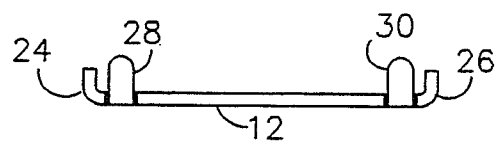
FIG. 3 is a left end view of the mounting bracket of FIG. 2.

Referring now to FIGS. 2 and 3, mounting bracket 12 is shown in greater detail. Mounting bracket 12 includes a substantially planar center portion 22 having a pair of upstanding guide rails 24 and 26 at opposing edges thereof for guiding connecting member 13 relative to mounting bracket 12. A first pair of spring seats 28 and 30 provide means for reacting spring loads of springs 19 and 20, respectively, and, in conjunction with a second pair of spring seats 32 and 34 of connecting member 13, trap springs 19 and 20 therebetween.

Figure 4:
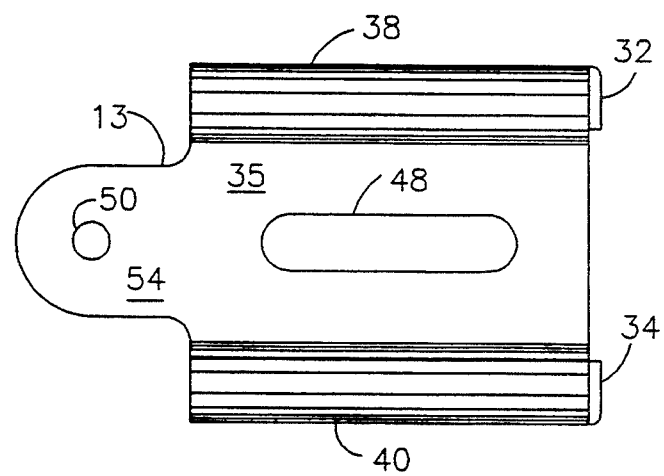
FIG. 4 is a reduced top plan view of a connecting member of the buckle assembly of FIG. 1.
Figure 5:
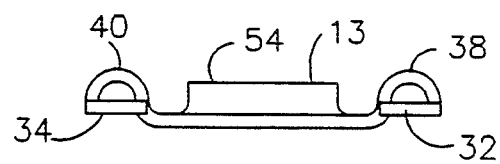
FIG. 5 is a right end view of the connecting member of FIG. 4.

Referring now to FIGS. 4 and 5, connecting member 13 is shown in greater detail. Connecting member 13 includes a substantially planar center portion 35 having a pair of spring retainers 38 and 40 at opposing edges thereof for containing springs 19 and 20, respectively, therein. Spring retainers 38 and 40 are cylindrically shaped corresponding to springs 19 and 20 and operate to prevent springs 19 and 20 from buckling as they are compressed. Connecting member 13 slides relative to mounting bracket 12 with spring retainers 38 and 40 being guided by guide rails 24 and 26.

Referring also to FIG. 1, connecting member 13 is shown coupled to mounting bracket 12 by fastener 42. Fastener 42 provides a predetermined clamp load which maintains the assembly of connecting member 13 to mounting bracket 12 while permitting the relative sliding motion therebetween. In this embodiment, fastener 42 is a shouldered hexagonal headed bolt and nut combination slidable relative to connecting member 13 against washer 44. Mounting bracket 12 includes a locating bolt hole 46 (FIG. 2) and connecting member 13 includes a corresponding elongated slot 48 (FIG. 4), wherein fastener 42 extends through hole 46 and slot 48 to slidably clamp the connecting member to the mounting bracket. Fastener 42 also provides corresponding means for mounting the buckle assembly 10 to, for example, a seat frame of a vehicle.

Connecting member 13 also includes a bolt hole 50 which receives a fastener 52 therethrough to connect with mounting clip 16 (FIG. 1). A raised portion 54 of connecting member 13 provides clearance for fastener 52 when assembled.

Figure 6:
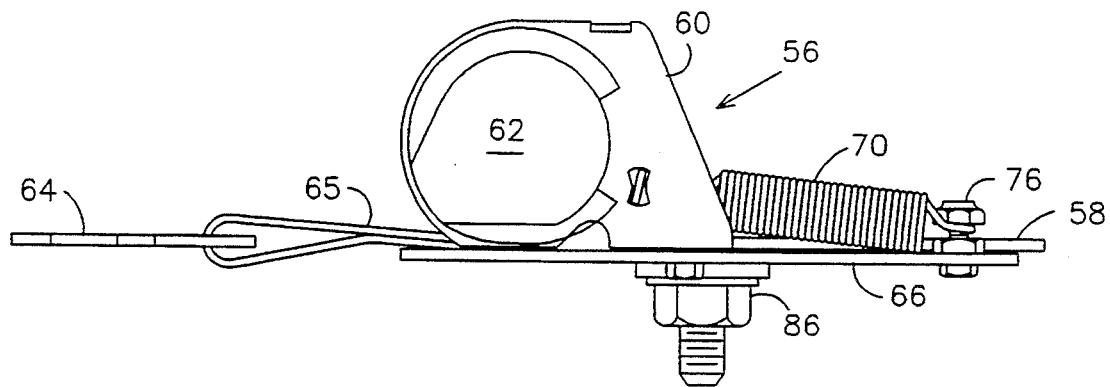
FIG. 6 is a side elevational view of a retractor assembly according to another embodiment of the present invention.
Figure 7:
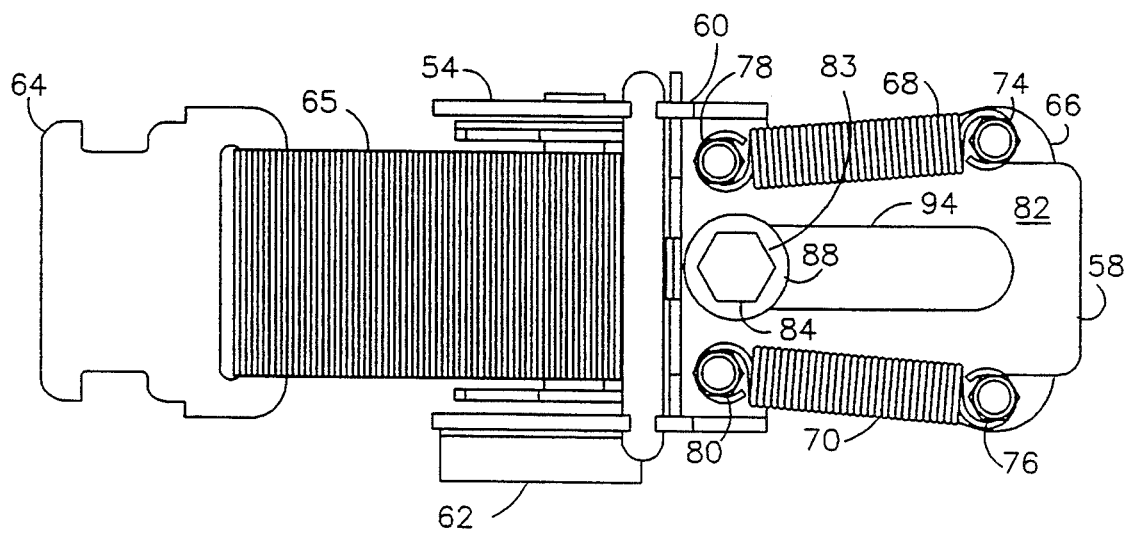
FIG. 7 is a top plan view of the retractor assembly of FIG. 6.

Referring now to FIGS. 6 and 7, a retractor assembly 56 is shown including a connecting member 58. Connecting member 58 includes a retractor housing 60 having a retractor 62 mounted therein. Retractor 62 is similar to that disclosed in U.S. Pat. No. 3,603,525, the disclosure of which is hereby incorporated by reference. Retractor 62 plays out a tongue 64 via webbing 65 wherein the tongue is adapted for releasably locking with buckle 11 of buckle assembly 10. Similar to buckle assembly 10, connecting member 58 is movable relative to mounting bracket 66 and, preferably, is slidable relative thereto as described hereafter with respect to subsequent FIGS. 8 and 9.

A pair of springs 68 and 70 urge connecting member 58 into a first position which holds retractor 62 in a retracted position relative to mounting bracket 66. Upon application of an external force when retractor 62 is locked, connecting member 58 slides to the left as viewed in FIG. 7 relative to mounting bracket 66 to a second, extended position. Upon relaxation of the external force, springs 68 and 70 urge connecting member 58 with retractor 62 to the right as viewed in FIG. 7 to the first position towards mounting bracket 66.

Figure 8:
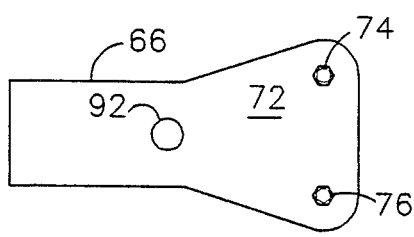
FIG. 8 is a reduced top plan view of a mounting bracket of the retractor assembly of FIG. 6.

Referring now to FIG. 8, mounting bracket 66 is shown in greater detail. Mounting bracket 66 includes a substantially planar center portion 72 having a pair of fasteners 74 and 76 at opposing edges thereof for guiding connecting member 58 relative to mounting bracket 66. Fasteners 74 and 76 are fastened to the spring ends and act as spring retention members for reacting spring loads of springs 68 and 70, respectively, and, in conjunction with a second pair of fasteners 78 and 80 of connecting member 58 connected to the opposite spring ends, retain springs 68 and 70 therebetween.

Figure 9:
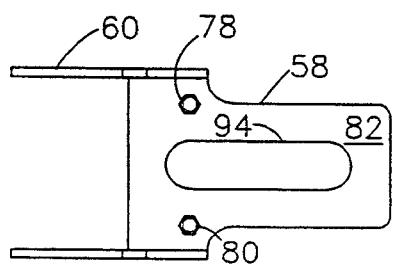
FIG. 9 is a reduced top plan view of a connecting member of the retractor assembly of FIG. 6.

Referring now to FIG. 9, connecting member 58 is shown in greater detail. Connecting member 58 includes a substantially planar center portion 82 having fasteners 78 and 80 at opposing edges thereof for retaining springs 68 and 70, respectively. The fastener heads of fasteners 78 and 80 provide primary guidance of connecting member 58. Connecting member 58 slides relative to mounting bracket 66 with center portion 82 being guided by fasteners 74 and 76 and by fasteners 78 and 80.

Referring also to FIGS. 6 and 7, connecting member 58 is shown coupled to mounting bracket 66 by fastener 83. Fastener 83 provides a predetermined clamp load which assembles connecting member 58 to mounting bracket 66 while permitting the relative sliding motion therebetween. In this embodiment, fastener 83 is comprised of a hexagonal headed bolt 84 and nut 86 slidable relative to connecting member 58 against washer 88. Mounting bracket 66 includes a locating bolt hole 92 (FIG. 8) and connecting member 58 includes a corresponding elongated slot 94 (FIG. 9), wherein fastener 83 extends through hole 92 and slot 94 to slidably clamp the connecting member to the mounting bracket. Fastener 83 also provides corresponding means for mounting the retractor assembly 56 to, for example, a seat frame of a vehicle.

In operation, buckle assembly 10 and retractor assembly 56 cooperate as follows. When tongue 64 is locked in buckle 11, the belt is retracted by the retractor 62 to rest against the user. In this condition, the retractor will not pay out any belting, and the user is restrained in position against the seat. If the seat moves downwardly, as may occur when traveling over a rough surface, the retractor will sense the presence of slack in the belt and will collect an additional corresponding length of belt. In the absence of the present invention, the user would be restricted by this action and would be held more firmly than desired in the seat, or the seat may in fact be held down in a constrained position. Further downward movement of the seat would result in additional cinching down of the user and seat.

If the buckle assembly 10 alone is incorporated with a standard retractor, when the seat moves back up to its original position the assembly 10 allows the buckle 11 to move outwardly. The force of the seat moving upward, as caused perhaps by the spring support for the seat, applies an external force causing connecting member 13 to move relative to mounting bracket 12 and move the buckle to the first extended position while the seat belt restricts movement of the user without increasing the gripping force on the user.

By incorporating retractor assembly 56 rather than a standard retractor in conjunction with buckle assembly 10, when the seat moves back up to its original position both the buckle assembly 10 and retractor assembly 56 pay out portions of the seat belt. The force of the seat moving upward applies an external force causing connecting member 13 to move relative to mounting bracket 12 and connecting member 58 to move relative to mounting bracket 66, thereby moving both the retractor and the buckle to their respective extended positions. As such, rather than a single portion of seat belt being payed out across the occupant, two portions of seat belt are payed out so as to result in the seat belt moving upwardly relative to the occupant. Slack is provided in both instances; however, the mechanism by which the slack is provided by the present invention (upwardly movement versus lateral movement) prevents both cinching and chafing of the occupants.

With both the retractor assembly and the buckle assembly paying out portions of seat belt, the seat is thus positioned in the starting position with the lap belt held against the user and tensioned by springs 19 and 20 urging the buckle back to its retracted position and springs 68 and 70 urging the retractor back to its retracted position.

When the seat and user again move downward, such as in reaction to a rough ride, assemblies 10 and 56, rather than the automatic locking retractor itself, collect slack. To assure this, the retracting force applied by each pair of springs 19 and 20 and springs 68 and 70 is predetermined to exceed that of the automatic locking retractor. Furthermore, the retracting force applied by the pair of springs 19 and 20 is equal to the retracting force applied by the pair of springs 68 and 70, to permit equal spring displacements of the pairs of springs and result in upwardly movement of the seat belt. Thus, the slackened belt is preferentially and equally collected by the buckle and retractor assemblies. The assemblies 10 and 56 thereby avoid both the cinching down of the lap belt against the user and the chafing across of the lap belt relative to the user.

Other buckle and retractor assemblies are contemplated as well by this invention. For example, referring now to FIGS. 10 and 11 a retractor assembly 100 is shown including cost reduction features. A connecting member 102 includes a retractor housing 104 adapted for mounting a retractor therein. Connecting member 102 is slidable relative to a mounting bracket 106. A pair of springs 108 and 110 urge connecting member 102 into a first retracted position. Upon application of an external force, connecting member 102 slides to the right as viewed in FIG. 10 relative to mounting bracket 106 to a second, extended position. Upon relaxation of the external force, springs 108 and 110 urge connecting member 102 back toward the left as viewed in FIG. 10 to the first position towards mounting bracket 106.

Figure 12:
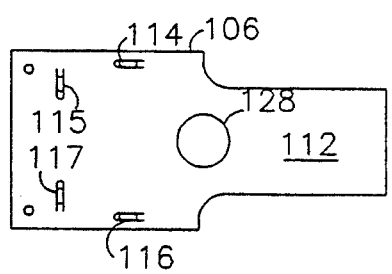
FIG. 12 is a reduced top plan view of a mounting bracket of the retractor assembly of FIG. 10.

Referring now to FIG. 12, mounting bracket 106 is shown in greater detail. Mounting bracket 106 includes a substantially planar center portion 112 having a pair of upwardly protruding spring tangs 114 and 116 at opposing edges attached to ends of springs 108 and 110 for reacting spring loads of springs 108 and 110, respectively, and, in conjunction with a second pair of upwardly protruding spring tangs 118 and 120 of connecting member 102 attached to opposite ends of springs 108 and 110 retain springs 108 and 110 therebetween. The inner sides of spring tangs 114 and 116 ride along sides 101 and 103 of connecting member 102 to provide guidance of connecting member 102. Mounting bracket 106 also includes assembly tangs 115 and 117 for maintaining the retractor assembly when center portion 122 of connecting member 102 is inserted therebetween.

Figure 13:
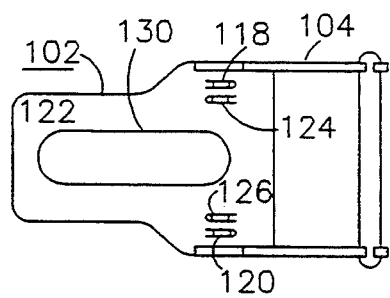
FIG. 13 is a reduced top plan view of a connecting member of the retractor assembly of FIG. 10.

Referring now to FIG. 13, connecting member 102 is shown in greater detail. Connecting member 102 includes substantially planar center portion 122 having spring tangs 118 and 120 at opposing edges thereof for retaining springs 108 and 110, respectively. Connecting member 102 also includes downwardly protruding guide tangs 124 and 126 for guiding the connecting member along center portion 112 of mounting bracket 106 when inserted between tangs 124 and 126 and assembled to mounting bracket 106.

Figure 10:
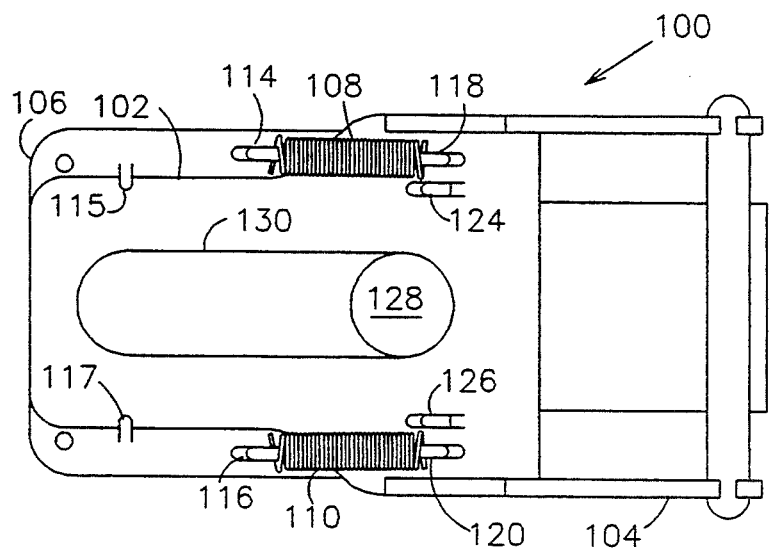
FIG. 10 is a top plan view of a retractor assembly according to yet another embodiment of the present invention.
Figure 11:
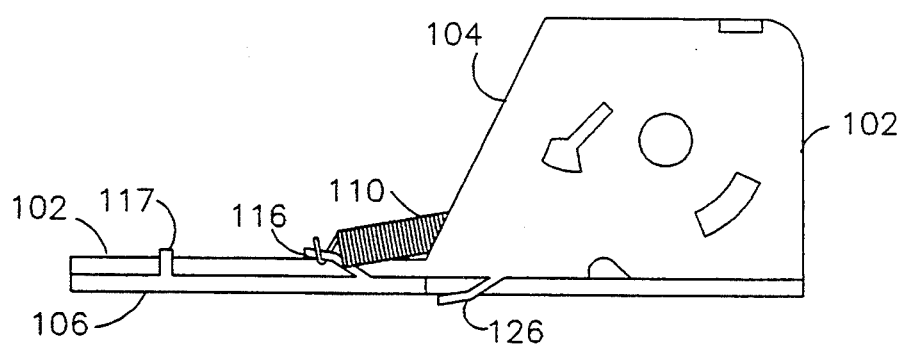
FIG. 11 is a side elevational view of the retractor assembly of FIG. 10.

Referring also to FIGS. 10 and 11, connecting member 102 is shown coupled to mounting bracket 106 by assembly tangs 115 and 117. Upwardly protruding assembly tangs 115 and 117 correspond to the planar center portion 82 of connecting member 58 to locate the connecting member to the mounting bracket while permitting the relative sliding motion therebetween. In this embodiment, both the connecting member and the mounting bracket are constructed of sheet steel with the upwardly and downwardly protruding tangs being stamped therefrom. Mounting bracket 106 includes an upwardly standing cylindrical bushing 128 (FIG. 12) and connecting member 102 includes a corresponding elongated slot 130 (FIG. 13), wherein bushing 128 extends through slot 130 to also slidably guide the connecting member relative to the mounting bracket. Busing 128 may also provide corresponding fastener means for mounting the retractor assembly 100 to, for example, a seat frame of a vehicle.

Figure 14:
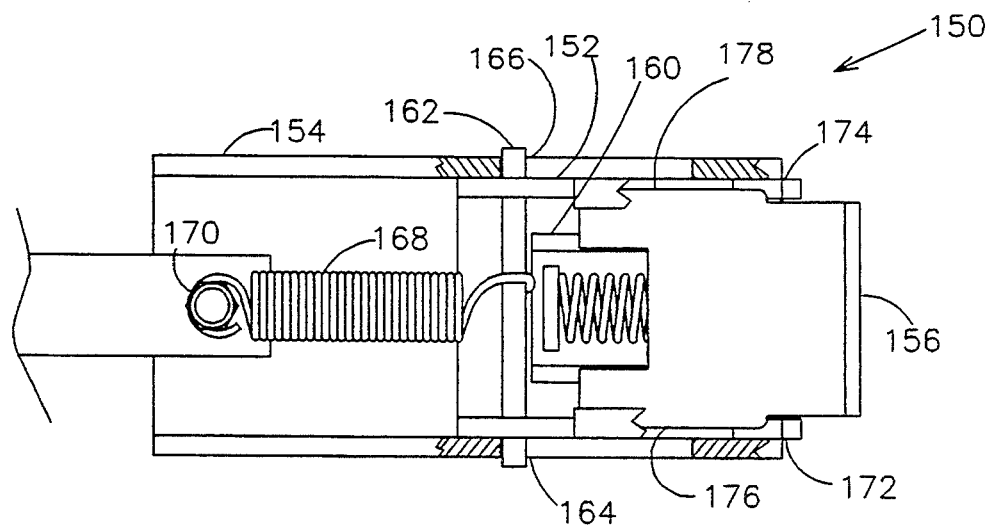
FIG. 14 is a fragmentary top plan view of an end release buckle assembly according to still yet another embodiment of the present invention.
Figure 15:
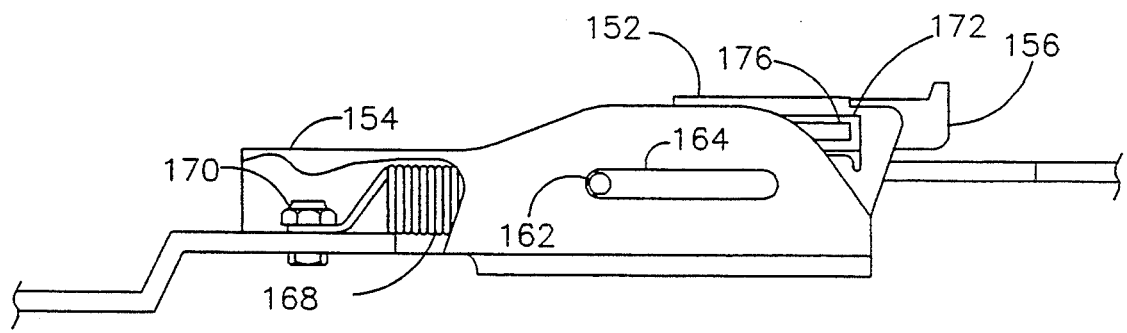
FIG. 15 is a fragmentary side elevational view of the end release buckle assembly of FIG. 14.

Referring now to FIGS. 14 and 15, an end release or side release buckle assembly 150 is shown. End release or side release buckle assembly 150 includes an end release or side release buckle 152 slidably engaged with a mounting bracket 154. Buckle 152 may be of any conventional end release or side release design such as those designs typically used with seat belts. For example, a buckle like that disclosed in U.S. Pat. No. 4,404,715 might find application in buckle assembly 150. The disclosure of U.S. Pat. No. 4,404,715 is hereby incorporated by reference. In FIGS. 14 and 15, buckle 152 is a conventional end release or side release buckle which operates to engage or disengage a mating tongue by pushing inwardly on button 156.

Means are provided for connecting the buckle 152 to the mounting bracket 154 via a connecting pin 162. Connecting pin 162 engages across the buckle 152 through corresponding slots 164 and 166 of mounting bracket 154. Slots 164 and 166 also serve to couple buckle 152 with the mounting bracket 154, wherein buckle 152 is movable along the slots relative to mounting bracket 154. Spring 168 is retained by connecting pin 162 and fastener 170 to urge buckle 152 into a first, retracted position relative to mounting bracket 154. Buckle 152 is movable relative to mounting bracket 154 against a predetermined resistive force provided by spring 168 into a second, extended position relative to mounting bracket 154.

Mounting bracket 154 includes a generally U-shaped channel having slots 164 and 166 at opposite sides thereof for guiding buckle 152 relative to mounting bracket 154. A fastener 170 attaches to the end of spring 168 to provide means for reacting the spring load of spring 168 and, in conjunction with connecting pin 162 of buckle 152 connected to the other end of spring 168, retain spring 168 therebetween. Buckle 152 includes a generally U-shaped channel slidably received in mounting bracket 154 and having opposing slots 172 and 174 for slidably receiving edge tangs 176 and 178 of button 156 therein.

Figure 16:
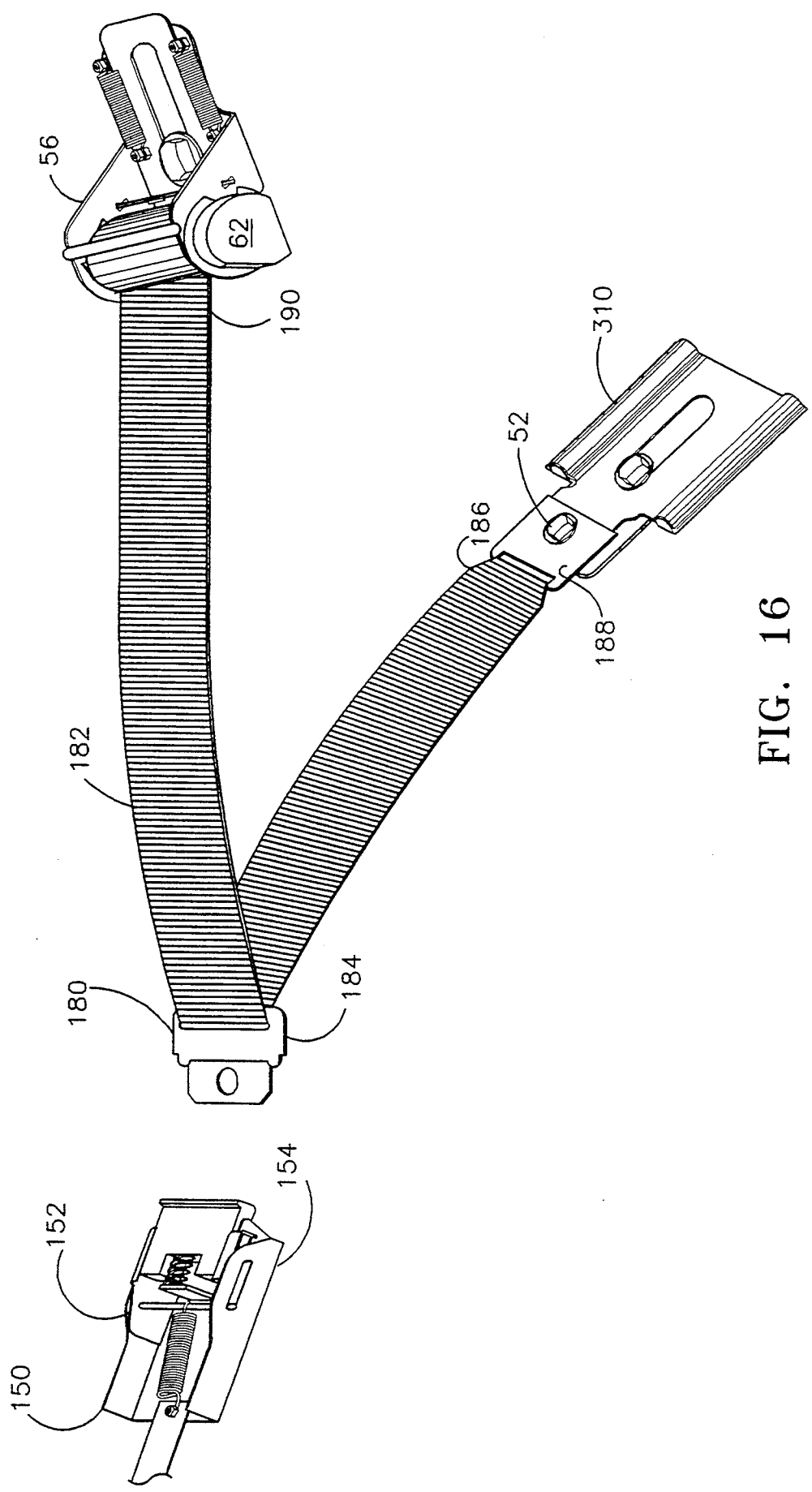
FIG. 16 is a perspective view of a seat belt system having a shoulder strap, including the retractor assembly of FIG. 6 and the end release buckle assembly of FIG. 14.

FIG. 16 represents one embodiment of a seat belt system constructed according to the present invention. The buckle assembly 150, including mounting bracket 154 and buckle 152, is arranged so that the mouth or receiving end of the buckle 152 is in a position to receive the leading edge of the tongue 180. The tongue 180 is preferably attached to flexible webbing 182 by means of an aperture 184 through which the flexible webbing 182 freely passes. One end 186 of the webbing 182 is attached to a mounting bracket 188 and end assembly 310. End assembly 310 is similar to buckle assembly 10; however, rather than incorporating a buckle 11 connected to a connecting member 13 via webbing 15 and mounting clip 16, end assembly 310 bolts directly to mounting bracket 188 via fastener 52. The second end 190 of the webbing 182 is attached to a retractor 62 of retractor assembly 56. Also contemplated as part of retractor assembly 56 is an emergency locking retractor substituting for retractor 62. The tongue 180 engages in the mouth of the buckle 152 to join the various pieces into an integrated complete system, thereby providing a means to restrain a user in a particular position in a seat.

Figure 17:
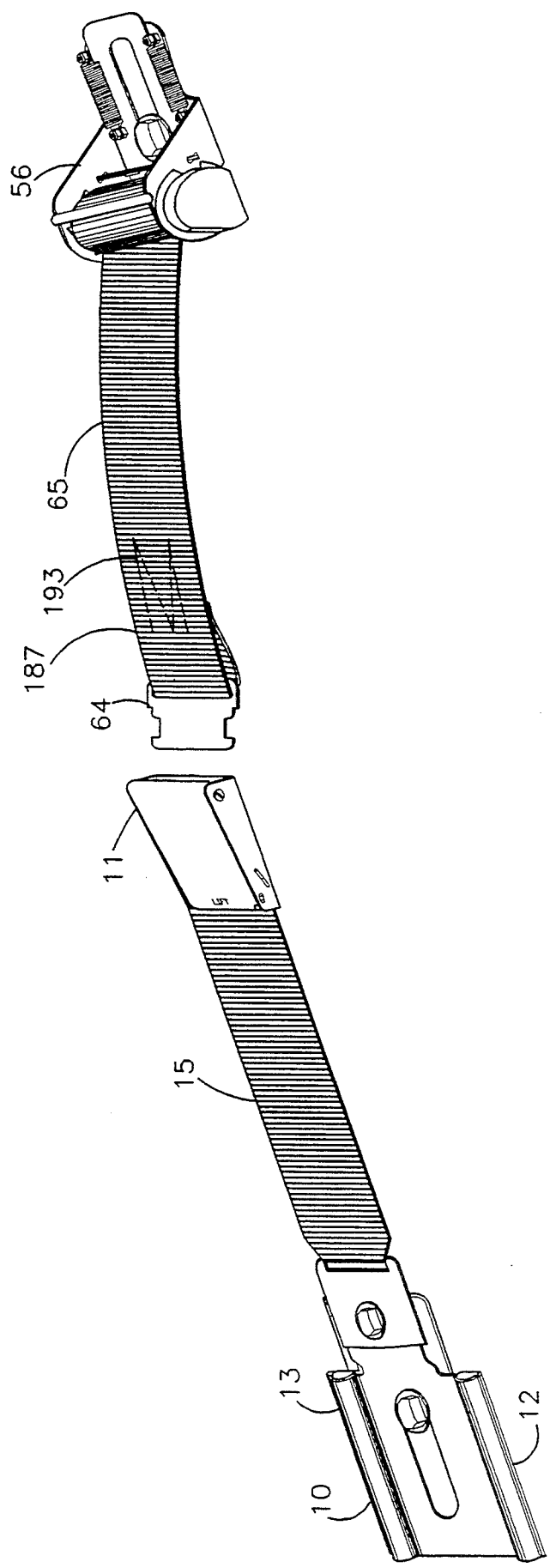
FIG. 17 is a perspective view of a lap seat belt system, including the retractor assembly of FIG. 6 and the buckle assembly of FIG. 1.

FIG. 17 shows another embodiment of the present invention, wherein the seat belt system is a lap belt system. In this case, the flexible webbing 65 of the retractor assembly 56 loops back through an aperture of the tongue 64. The end 187 of the flexible webbing furthest from the retractor assembly 56 is then held in place with stitching 193. The tongue 64 is positioned to engage in the mouth or receiving end of the buckle assembly 10, previously disclosed in relation to FIG. 1, to join the various pieces into an integrated complete system useful to restrain a user within a seat.

Figure 18:
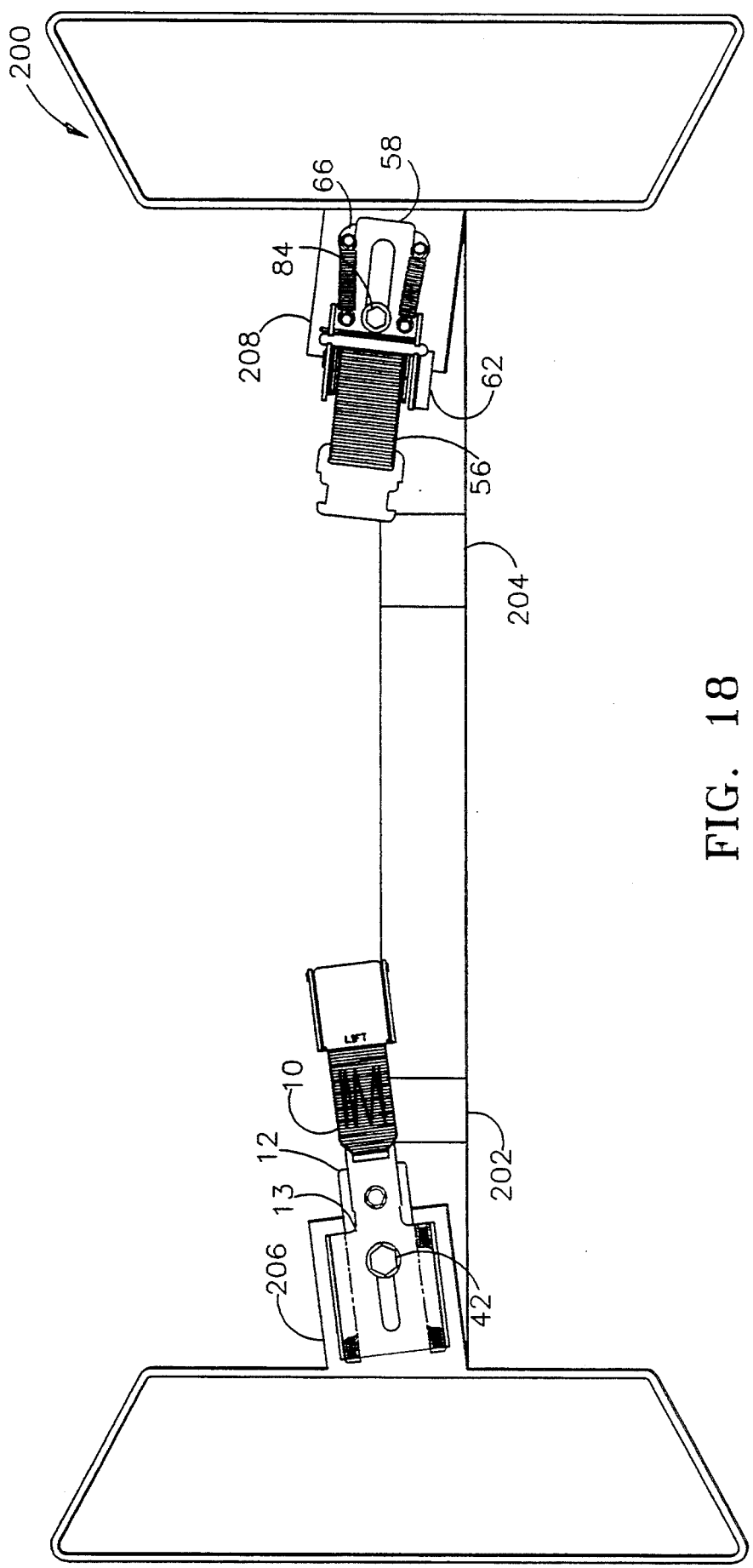
FIG. 18 is a top plan view of a seat frame having mounted thereon the buckle assembly of FIG. 1 and the retractor assembly of FIG. 6.

Referring now to FIG. 18, a seat belt buckle assembly 10 is shown connected to a seat frame 200. A corresponding retractor assembly 56 is shown connected at the opposite end of the seat frame. In a typical application, the operator is seated on a seat which is spring supported and displaceable relative to the seat frame 200. As the seat moves relative to the seat frame, buckle assembly 10 and retractor assembly 56 each pay out portions of the seat belt to prevent both cinching and chafing of the occupant when the retractor 62 of retractor assembly 56 is in its locked position. Seat frame 200 is preferably bolted to a vehicle frame via mounting pad portions 202 and 204. Buckle assembly 10 bolts to seat frame 200 via fastener 42, wherein fastener 42 extends through a vertical support portion 206 of the seat frame to receive a corresponding nut thereon for fixedly clamping to the seat frame. As such, a double nut locking combination is provided by fastener 42, wherein buckle assembly 10 is locked to the seat frame and connecting member 13 is slidably clamped to mounting bracket 12.

Similarly, retractor assembly 56 is bolted to a vertical support portion 208 of the seat frame. Bolt 84 extends through vertical support 208 to receive a corresponding nut thereon for fixedly clamping to the seat frame. As such, a double nut locking combination is also provided with the retractor assembly, wherein the retractor assembly is locked to the seat frame and connecting member 58 is slidably clamped to mounting bracket 66.

Figure 19:
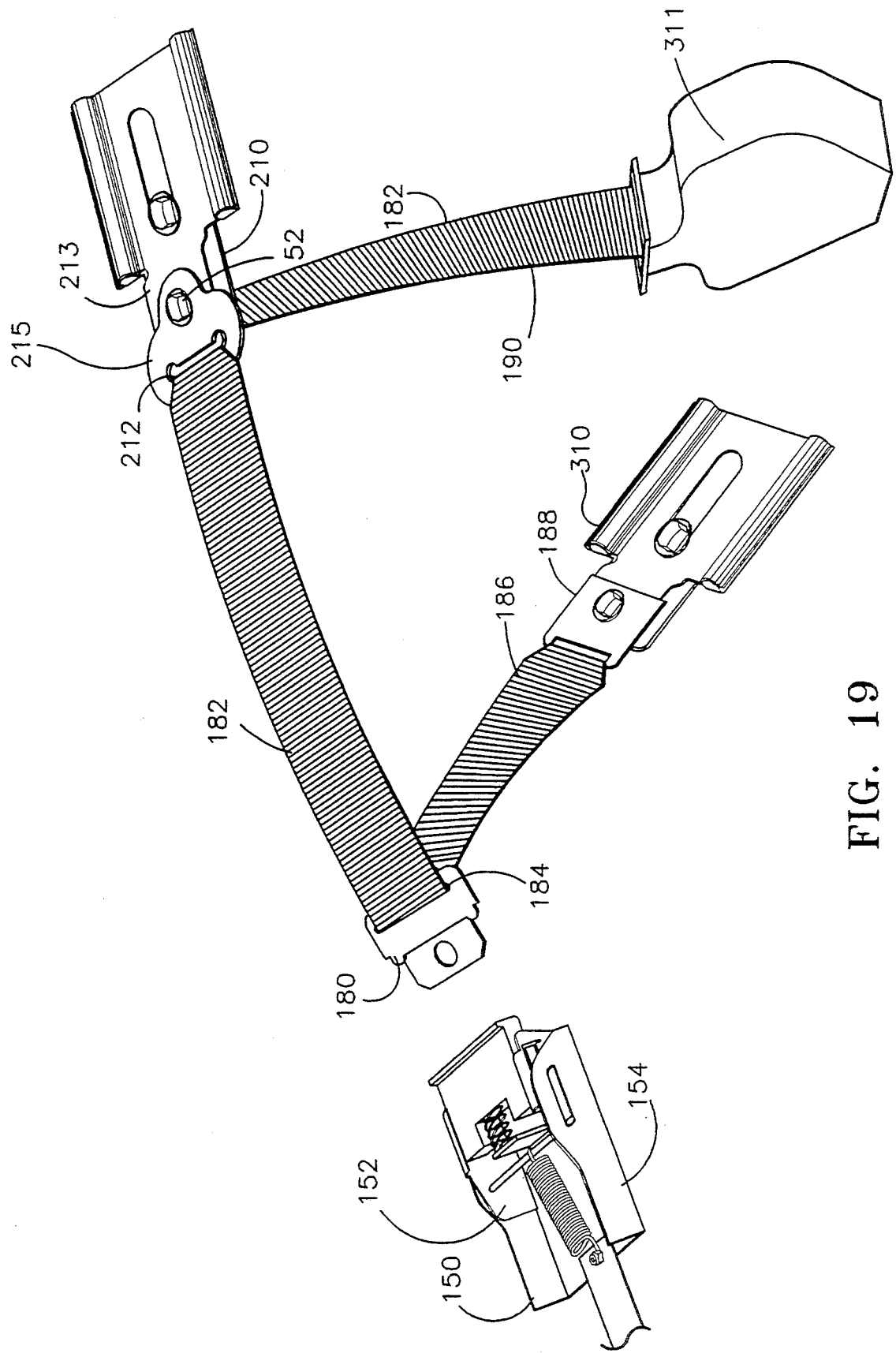
FIG. 19 is a perspective view of a seat belt system having a shoulder strap, including the retractor assembly of FIG. 6, the end release buckle assembly of FIG. 14 and a D-loop assembly.

Referring now to FIG. 19, embodiment of a seat belt system constructed employing a D-loop mounting bracket is shown. The buckle assembly 150, including mounting bracket 154 and buckle 152, is arranged so that the mouth or receiving end of the buckle 152 is in a position to receive the leading edge of the tongue 180. Similar to the system shown in FIG. 16, tongue 180 is preferably attached to flexible webbing 182 by means of an aperture 184 through which the flexible webbing 182 freely passes.

In addition to a mounting bracket 188 and an end assembly 310, the seat belt system of FIG. 19 also includes a D-loop assembly 210 and a retractor housing 311 containing either a standard locking retractor or an emergency locking retractor. D-loop assembly 210 includes a D-loop 215 having an aperture 212 through which the flexible webbing 182 freely passes. D-loop assembly 210 is similar to buckle assembly 10; however, rather than incorporating a buckle 11 connected to a connecting member 13 via webbing 15 and mounting clip 16, D-loop 215 bolts directly to connecting member 213 via fastener 52. In FIG. 19, the predetermined resistive spring forces provided by buckle assembly 150, end release assembly 310 and D-loop assembly 210 are not necessarily equal. Instead, the predetermined resistive spring forces are adjusted relative to the seat belt system shown in FIG. 19 to minimize the lateral movement of webbing 182 across an occupant restrained thereby in response to an external force applied to the seat belt system. As such, the spring forces are adjusted to facilitate substantially vertical displacement of the webbing 182 relative the occupant to prevent chafing and to facilitate reduced lateral accelerations applied to the upper torso of the occupant by the seat belt system.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An anti-cinch and anti-chafe seat belt system for extending across the chest and lap of a passenger comprising:

first locking means;
second locking means releasably engageable with said first locking means;
retracting means having a web with an inner end wound therein and further having an outer end with said second locking means mounted between said inner end and said outer end, said web extending freely slidably at all times through said second locking means;
first bracket means attachable to a structure with said web attached thereto;
first connecting means connected with said web and said first bracket means and being movable relative to said first bracket means between first and second positions, said first connecting means being retracted relative said first bracket means in the first position and being extended relative said first bracket means in the second position, said first connecting means including a D-loop positioned with said first bracket means between said retracting means and said second locking means;
first spring means for biasing said first connecting means in the first position operable to allow limited web movement without web extension from said retracting means;
first fastening means coupling said first connecting means with said first bracket means;
second bracket means attachable to a structure with said outer end of said web attached thereto;
second connecting means connected with said web and said second bracket means and being movable relative to said second bracket means between a third position and a fourth position, said second connecting means being retracted relative said second bracket means in the third position and being extended relative said second bracket means in the fourth position;
second spring means for biasing said second connecting means in the third position operable to allow limited web movement without web extension from said retracting means, said first spring means and said second spring means releasably biasing respectively said first connecting means and said second connecting means limiting chafing by said web;
second fastening means coupling said second connecting means with said second bracket means;
third bracket means attachable to a structure with said first locking means attached thereto;
third connecting means connected with said third bracket means and being movable relative to said third bracket means between a fifth position and a sixth position, said third connecting means being retracted relative said third bracket means in the fifth position and being extended relative said third bracket means in the sixth position; and,
third spring means for biasing said third connecting means in the fifth position operable when said first locking means is locked to said second locking means to allow limited web movement without web extension from said retracting means, said first spring means and said third spring means limiting chafing by said web between said D-loop and said first locking means across the chest of the passenger with said second spring means and said third spring means limiting chafing by said web between said second bracket means and said first locking means across the lap of the passenger.

* * * * *